Sept. 15, 1970    W. C. N. HOPKINS    3,528,304
POWER LIFT
Filed March 20, 1968    2 Sheets-Sheet 1
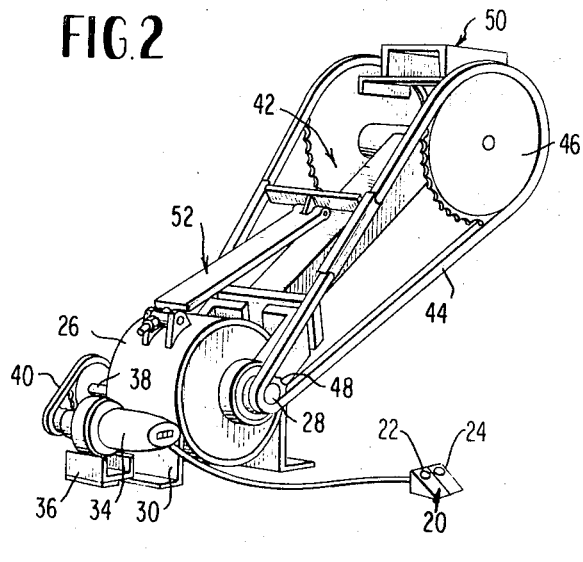
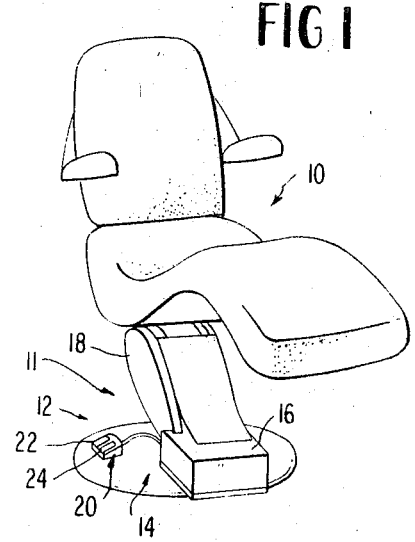
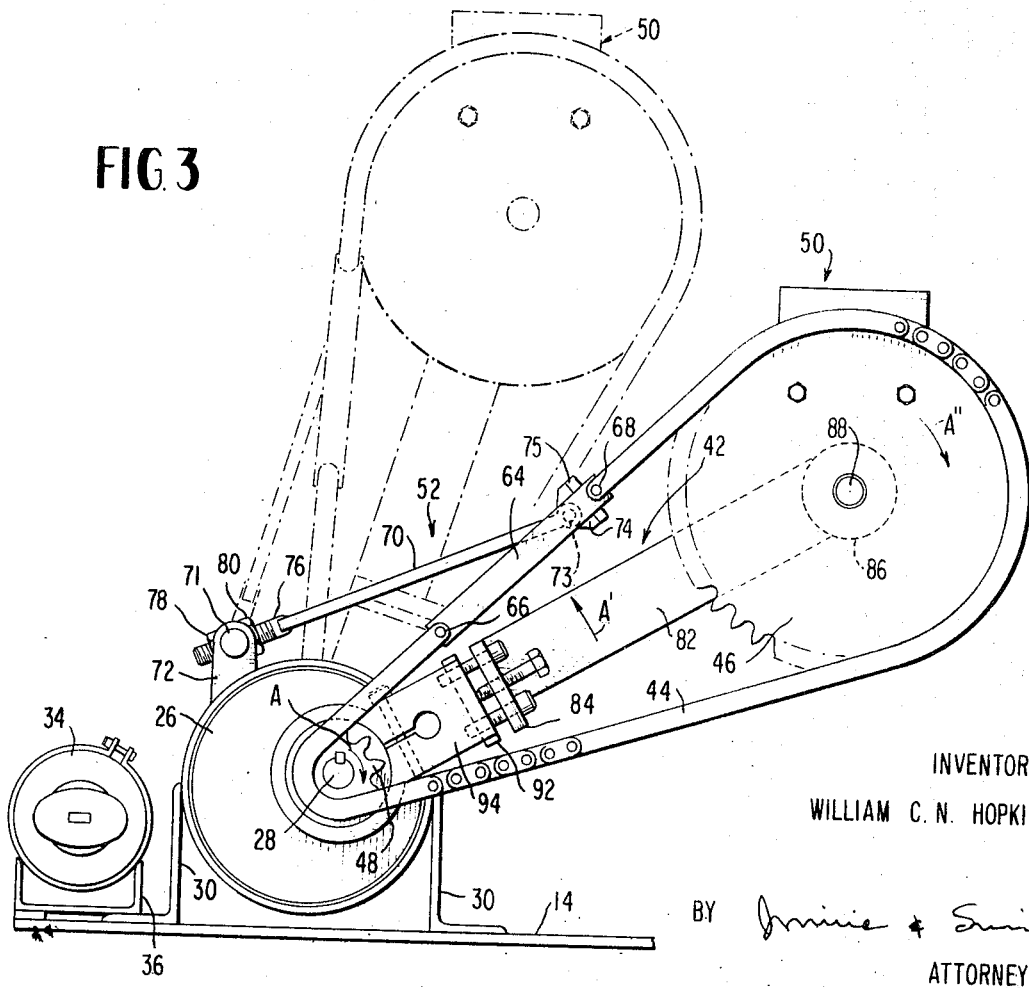
INVENTOR
WILLIAM C. N. HOPKINS
BY *Jinnie & Smiley*
ATTORNEYS Sept. 15, 1970     W. C. N. HOPKINS     3,528,304

POWER LIFT

Filed March 20, 1968

INVENTOR
WILLIAM C. N. HOPKINS

BY *Smiley & Smiley*

ATTORNEYS

United States Patent Office 3,528,304
Patented Sept. 15, 1970

3,528,304
POWER LIFT
William C. N. Hopkins, P.O. Box 551,
Walnut Creek, Calif. 94596
Filed Mar. 20, 1968, Ser. No. 714,514
Int. Cl. F16h 27/02, 29/02, 29/20
U.S. Cl. 74—89.21         10 Claims

ABSTRACT OF THE DISCLOSURE

One end of an arm having driven sprocket means rotatably mounted on its free end is pivotally mounted coaxially with a power shaft having drive sprocket means fixed thereon. An endless chain means trained about the sprocket means provided with a strut to anchor the chain so that rotation of the drive sprocket means in one direction imparts swinging motion to the arm in the opposite direction without effecting any net angular movement of the driven sprocket means. The driven sprocket means serves as the load bearing portion of the assembly.

BACKGROUND OF INVENTION

In the field of power lifts for elevating and lowering relatively small loads, such as dental chairs, examination tables, floor jacks and the like, the power source usually comprises hydraulic fluid under pressure. These lifts are subject to certain defects in many instances in that they are subject to failure through leakage, they are limited in the extent of the length of lift by the length of the cylinder and piston stroke, and in the event of fluid leakage, the fluid may damage office furnishings, such as rugs, carpets and the like.

SUMMARY OF INVENTION

The present invention comprises a power lift that is actuated mechanically, and may be powered by a relatively small electric motor that is inexpensive to operate. The motor is connected to a gear reduction unit having an output shaft with drive sprocket means fixed thereon. One end of an arm is pivotally mounted coaxially with the output shaft, and carries driven sprocket means on its free end. Endless chain means is trained about the sprocket means, but is anchored by a strut conveniently, pivotally mounted on the gear reduction unit so that drive imparted to the chain means causes rotation of the driven sprocket means in one direction, but due to the strut, imparts swinging motion to the arm in the opposite direction. Depending upon the adjustment of the length of the strut, the swinging movement may be effected without causing any net angular movement of the driven sprocket means. A load bearing element is carried by the driven sprocket means. If desired, means may be provided for quickly adjusting the length of the strut to impart a tilting action to the load bearing element.

BRIEF DESCRIPTION OF DRAWINGS

FIG. 1 is a perspective view illustrating the power transmitting device according to the present invention as applied to a dental chair;

FIG. 2 is a perspective view showing the power transmitting device according to a preferred embodiment of the present invention;

FIG. 3 is an enlarged side elevational view of the assembly shown in FIG. 2 illustrating in full and broken line positions thereof the manner in which the device moves to transmit power;

DETAILED DESCIPTION OF INVENTION

Figure 4:
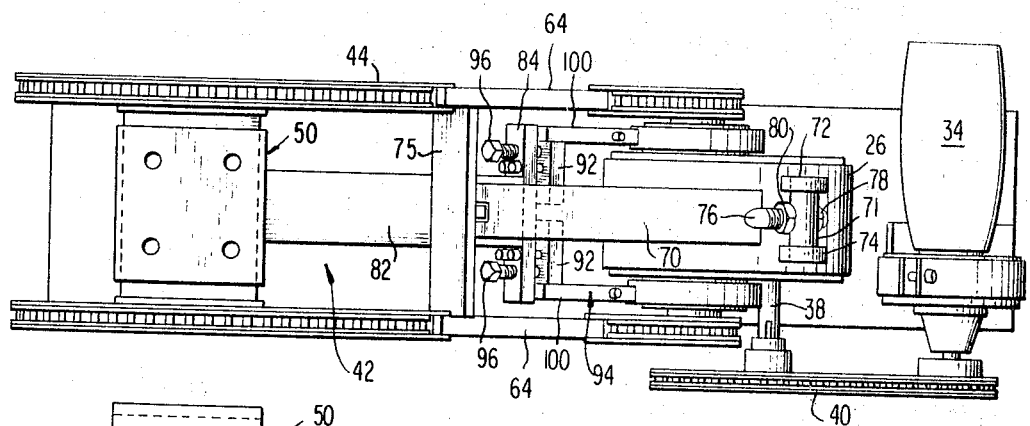
FIG. 4 is a plan view of the assembly shown in FIGS. 2 and 3.

With reference now more particularly to FIG. 1, a preferred commercial form of the invention is shown as a power lift 11 in conjunction with a dental chair 10, and which may take any conventional or convenient form. The power assembly 11, according to the present invention, which, in the environment shown in FIG. 1, is utilized to raise and lower the chair 10 under the selective control of the dentist or technician without imparting tilting motion to the chair 10 incidental to such movement.

This power assembly 11 comprises a base portion 12 which may simply take the form of a circular plate 14 that supports an operating assembly housed within a section 16 and which operates a lifting arm housed in a section 18, the mechanisms enclosed within the housings 16 and 18 being hereinafter more particularly shown and described. Preferably, the device is electrically operated and has in association therewith a treadle or foot switch 20 having a pair of treadles 22 and 24 thereon, one for actuating the device to move the arm section 18 in a downward direction and the other for actuating the device to lift the arm 18 in an upward direction.

The mechanism enclosed within the housings 16 and 18, as shown in FIG. 2, comprises a gear reduction unit 26 of conventional form and which includes a power output shaft 28 that projects from the opposite sides thereof, the unit 26 being provided with suitable support means 30 by means of which it is rigidly attached to the plate 14 to form a part of the base assembly 12 for the unit. An electric drive motor 34 is mounted by a suitable bracket 36 on the plate 14 in fixed relationship to the gear reduction unit 26, and drives the input shaft 38, FIGS. 4 and 5, of the gear reduction unit through a suitable endless member 40, such as a chain.

An arm assembly 42 is adapted to be swung in a vertical plane through the medium of an endless member 44, such as a chain, trained about a driven wheel 46 journaled on the free end of the arm assembly 42, and a sprocket or drive wheel 48 fixed to the output shaft 28. As will hereinafter appear, this drive arrangement is duplicated at both sides of the arm assembly 42. A load supporting platform assembly 50 is rigidly affixed to and between the driven wheels 46.

The arrangement may be such that the platform 50 is caused, through the intermediary of a strut assembly 52, to remain in parallel relationship with respect to a reference plane on the base assembly 12. In the particular instance shown, for use in conjunction with the dental chair 10 in FIG. 1, the reference plane is horizontal so that independent adjustment for tilt of the chair 10 may be made by the technician or dentists, and the integrity of this adjustment will be maintained throughout the raising and lowering action imparted to the chair 10 by means of the power assembly according to the present invention.

With reference now more particularly to FIG. 3, certain of the operational characteristics of the present invention will be explained in conjunction therewith. The full line position of the component parts illustrates an intermediate or lowered position of the arm assembly 42, whereas the phantom line illustration indicates an elevated position of the arm assembly. It will be clear that in order to retain the platform assembly 50 in a predetermined fixed relationship with respect to some fixed reference plane, i.e. parallel therewith, that the driven wheel 46 must rotate about its axis through an angle which is equal to the angle through which the arm is swung.

Thus, with an elevating drive direction for the drive wheel or sprocket 48 on the power shaft 28, as shown by the direction of the arrow A in FIG. 3, the arm will be swung upwardly in the direction of the arrow A' and will impart a corresponding rotation to the driven wheel 46 in the direction of the arrow A" so that as the arm is swung between the full and phantom line positions, the wheel 46 will rotate in the direction of the arrow A" an angle equal to the angle through which the arm is swung. Thus, no net rotation is imparted to the driven wheel 46 during any direction of swinging of the arm assembly 42.

Because of this characteristic of the device, it will be appreciated that the lower flight side of the endless chain 44 is the tension side, since the platform 50 is so located with respect to the driven wheel 46 that weight uniformly loaded thereon will impart a reaction force extending vertically through the axis of rotation of the driven wheel 46. Since it is preferable to maintain both the upper and lower flights of the endless chain in tension, any practical design configuration of the device will usually take into consideration the possibility of utilizing the reaction force tending to rotate the driven wheel 46 in the direction of the arrow A" so that both the upper and lower flights of the endless member are tensioned. In this way, "give" with respect to the platform 50 may be avoided. The platform 50 may be attached to the device which supports the chain 10 in such fashion that a moment is applied in the direction of the arrow A" or the platform may be shifted to the right in FIG. 3 inherently to provide a moment arm acting on the driven wheel 46 even if the loading on the platform 50 is uniform and in a vertical downward direction.

The manner in which the reverse rotation of the driven wheel 46 with respect to the swinging action of the arm assembly 42 is achieved is by virtue of the strut assembly 52. This assembly comprises a strut arm 70 which is pivotally mounted at one end by a shaft or trunion 71 journaled in bracket ears 72 fixed to the gear housing 26. The other end of the strut arm or link 70 is connected to the endless chain means 44 by a crosspin or shaft 73 which may constitute the pivot between adjacent links of the chain means 44. Preferably, however, to impart greater strength to the assembly, the endless chain means may be joined at the opposite free ends by an elongate rigid link member 64, the joining pins 66 and 68 serving as connections to the opposite ends of the chain means 44 and the strut arm 70 may be pivotally attached by the pin 73 through ears 74 to crossbar 75 that is rigidly connected directly to this elongate rigid link member 64.

The strut 70 may be provided with a threaded end portion 76 on which a pair of adjusting nuts 78 and 80 are provided in straddling relationship to the shaft 71 for increasing and decreasing the effective length of the arm 70 for fine adjustment, whereby accurately to obtain the precise and desired backward rotation of the driven wheel 46 with respect to the angle through which the arm assembly 42 is swung.

Figures 6, 7A, 7B:
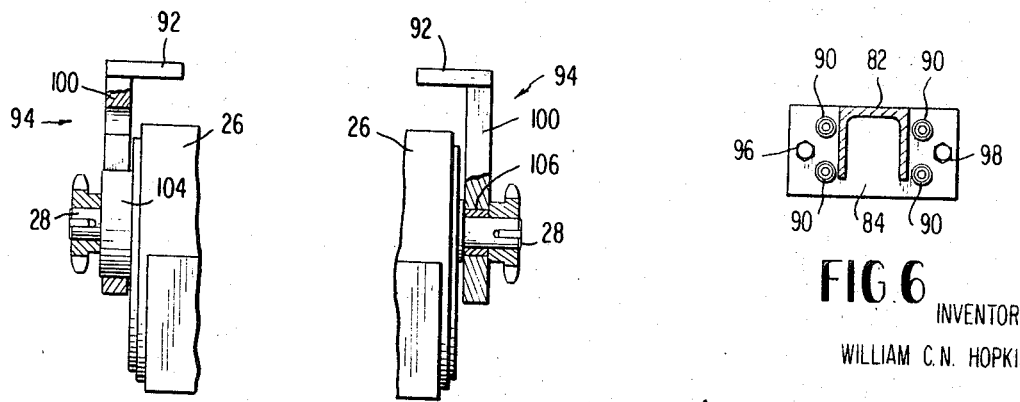
FIG. 6 is a transverse section taken substantially along the plane of line 6—6 in FIG. 5.
FIG. 7A is a view partly broken away showing one manner of mounting one side of the arm.
FIG. 7B is a view similar to FIG. 7A, but showing an alternative mounting for the arm associated with the opposite side thereof.

The arm assembly 42, as can be seen more clearly in FIG. 6, may comprise a channel-shaped outer member 82, the inner end portion of which is fixed to a mounting and adjusting flange 84, and the outer end of which is fixed to a boss 86 which carries the shaft 88 for the driven wheel means 46 in rotatable relation therewithin. The mounting flange 84 is provided with a plurality of fasteners 90 attaching it to a mounting plate portion 92 on an inner arm portion 94. The plate 92 preferably is threaded for reception of the fasteners 90, and in order to effectively extend or shorten the length of the arm assembly 42, whereby to properly tension the endless chains 44 associated therewith, adjusting bolts 96 are threaded through the plate 84 to bear on the plate 92.

The inner end portion 94 of the arm assembly 42 is split into right and left halves as illustrated in FIGS. 7A and 7B. Each half includes a bearing plate portion 100 carrying a portion of the mounting plate 92, the two mounting plate portions being bridged by mounting flange 84 of the outer portion 82 of the arm assembly. FIGS 7A and 7B also illustrate alternative mounting means for the bearing plates 100. In FIG. 7A, the outer race 104 of a ball or roller bearing mount on the output shaft 28 is embraced and held in place by the bearing plate 100. In FIG. 7B, the bearing plate 100 shown therein is simply provided with a bushing 106 receiving the output shaft 28. In either case, the arm assembly 42 is journaled directly on the output shaft 28 although it will be appreciated that any means coaxially journaling the arm 42 with respect to the output shaft 28, such as collars on the casing 26, will be effective to produce the desired results.

Figure 5:
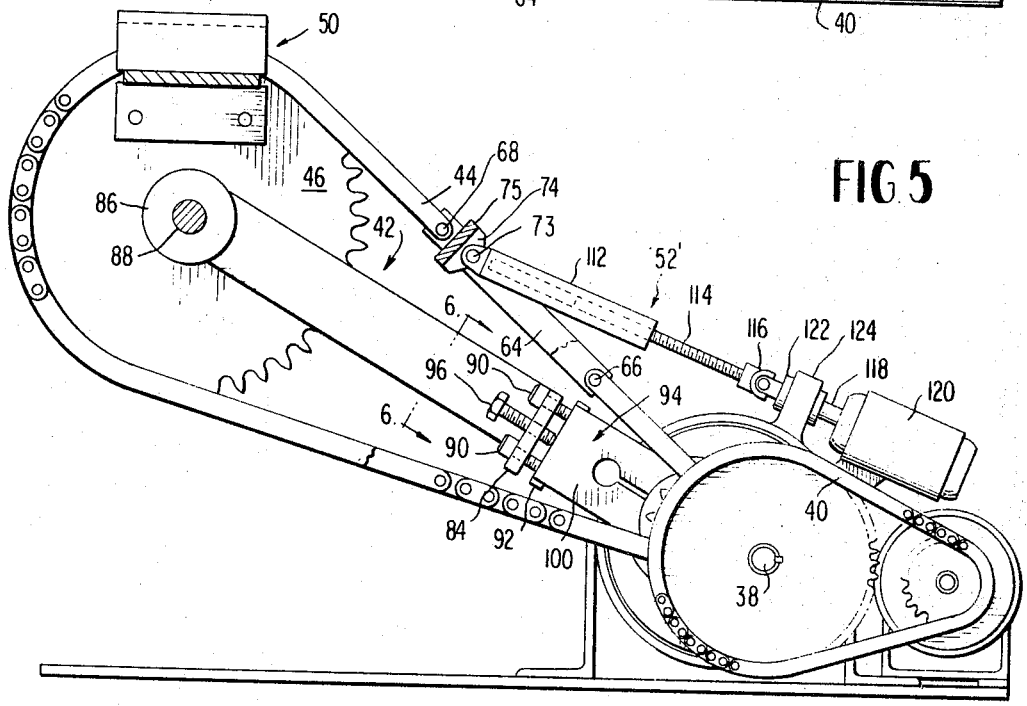
FIG. 5 is a side elevational view similar to FIG. 3, but showing the opposite side of the device and including a modified form of the invention.

In some instances, it may be desirable to enable ready tilting of the platform 50, as, for example, in association with an examination table. For this purpose, as shown in FIG. 5, the strut assembly 52' comprises a pair of relatively extensible parts 112 and 114, the part 112 comprising an internally threaded sleeve or nut threadedly receiving the worm portion 114. The nut 112 is pivotally connected to the chain assembly by a pin 73, as before, whereas the opposite end of the worm 114 is coupled through a universal joint 116 to the output shaft 118 of a motor 120. Conveniently, the motor 120 is mounted on the housing 26 and, preferably, the output shaft 118 is supported by an outboard bearing 122 carried by a bracket 124. As will be evident, actuation of the motor 120 to increase or decrease the effective length of the strut 52' will result in net angular movement of the driven wheel 46 in one direction or the other. Also, this arrangement may be used as a fine adjustment of the strut length when it is desired to maintain zero net angular movement of the driven wheel.

What is claimed is:

1. In a power actuator device, in combination,
   a base assembly including a rotable power shaft,
   a driving wheel fixed on said power shaft for rotation therewith,
   an arm assembly rotatably mounted at one end on said base assembly on an axis parallel to that of said power shaft,
   a driven wheel journaled on the other end of said arm assembly about an axis parallel to said power shaft,
   an endless member trained about said driving and driven wheels,
   means for driving said power shaft,
   and strut means connected at its opposite ends respectively to said endless member and to said base assembly for imparting angular motion to said arm assembly in response to rotation of said power shaft.

2. In a power actuator device, in combination,
   a base assembly including a rotatable power shaft,
   a driving wheel fixed on said power shaft for rotation therewith,
   an arm assembly rotatably mounted at one end on said base assembly on an axis parallel to that of said power shaft,
   a driven wheel journaled on the other end of said arm assembly about an axis parallel to said power shaft,
   an endless member trained about said driving and driven wheels,
   means for driving said power shaft,
   strut means connecting said endless member to said base assembly for imparting angular motion to said arm assembly in response to rotation of said power shaft,
   a load supporting member fixed to said driven wheel and having a reference plane, and
   said strut means comprising a strut pivotally connected at one end to said endless member between said drive and driven wheels and pivotally connected at its other end to said base assembly to maintain said load supporting member reference plane in parallel relation with respect to a fixed reference plane as said arm is swung about its axis.

3. A power actuator according to claim 2 wherein said arm assembly is rotatably mounted on said power shaft.

4. A power actuator according to claim 1 wherein said strut means constrains said driven wheel to rotate angularly at the same rate as said arm assembly.

5. A power actuator according to claim 4 wherein said driven wheel is rotated with respect to said arm assembly in the opposite direction of rotation imparted to said arm assembly.

6. A power actuator according to claim 1 wherein said arm assembly is rotatably mounted on said power shaft.

7. In a power actuator device, in combination, a base assembly including a rotatable power shaft, a driving wheel fixed on said power shaft for rotation therewith, an arm assembly rotatably mounted at one end on said base assembly on an axis parallel to that of said power shaft, a driven wheel journaled on the other end of said arm assembly about an axis parallel to said power shaft, an endless member trained about said driving and driven wheels, means for driving said power shaft, strut means connecting said endless member to said base assembly for imparting angular motion to said arm assembly in response to rotation of said power shaft, said strut means comprising a strut which is adjustable in length to adjust the angular position of said load support means reference plane.

8. A power actuator according to claim 7 wherein said strut includes first and second relatively extensible portions.

9. A power actuator according to claim 8 including means for relatively rotating said first and second portions of the strut for varying its effective length.

10. A power actuator according to claim 1, comprising a chair mounted on said load supporting member.

References Cited

UNITED STATES PATENTS

| | | | |
|---|---|---|---|
| 2,616,768 | 11/1952 | Stemm | 182—2 |
| 2,719,471 | 10/1955 | Aspden et al. | 248—157 |
| 2,798,719 | 7/1957 | Pickles | 74—89.15 |
| 2,903,896 | 9/1959 | Greene | 74—89.21 |
| 3,302,971 | 2/1967 | Lory | 108—145 |

FRED C. MATTERN, Jr., Primary Examiner

U.S. Cl. X.R.

297—347; 182—2